United States Patent [19]

Pett

[11] 4,331,535
[45] May 25, 1982

[54] LEAKAGE DETECTING AND DETOURING FILTER HOUSING-ASSEMBLY

[75] Inventor: Manfred Pett, Gleichen-Bremke, Fed. Rep. of Germany

[73] Assignee: Sartorius GmbH, Fed. Rep. of Germany

[21] Appl. No.: 158,790

[22] Filed: Jun. 12, 1980

[30] Foreign Application Priority Data

Jun. 15, 1979 [DE] Fed. Rep. of Germany ... 7917271[U]

[51] Int. Cl.³ ............................................. B01D 27/00
[52] U.S. Cl. ..................................... 210/85; 210/248; 210/323.2; 210/443; 210/450
[58] Field of Search ................. 210/85, 93, 248, 323.2, 210/339, 340, 341, 346, 347, 435, 443–445, 450, 453, 474

[56] References Cited

U.S. PATENT DOCUMENTS

| | | | |
|---|---|---|---|
| 1,203,835 | 11/1916 | Zahn | 210/85 |
| 3,298,522 | 1/1967 | Muller | 210/DIG. 10 |
| 3,406,831 | 10/1968 | Bush et al. | 210/438 |
| 3,850,813 | 11/1974 | Pall et al. | 210/232 |
| 4,126,559 | 11/1978 | Cooper | 210/448 |

FOREIGN PATENT DOCUMENTS 1163965 10/1969 United Kingdom .
566607 8/1977 U.S.S.R. .............................. 210/248

Primary Examiner—Peter A. Hruskoci
Attorney, Agent, or Firm—Eric P. Schellin

[57] ABSTRACT

A multipart filter case assembly for holding at least one cartridge-shaped filter element for sterile filtration of fluids comprises means to detect and detour leaking fluids, and includes a bell-shaped top part; an intermediate plate, which closes off the top part; an end cap; a filter-chamber, which closes off the intermediate plate; at least two ring-shaped packings arranged at a longitudinal distance on the end cap against the top part; a filtrate chamber, which closes off the intermediate plate; and at least one leakage control channel, which connects the space between the two ring packings with the outside of the case.

1 Claim, 2 Drawing Figures

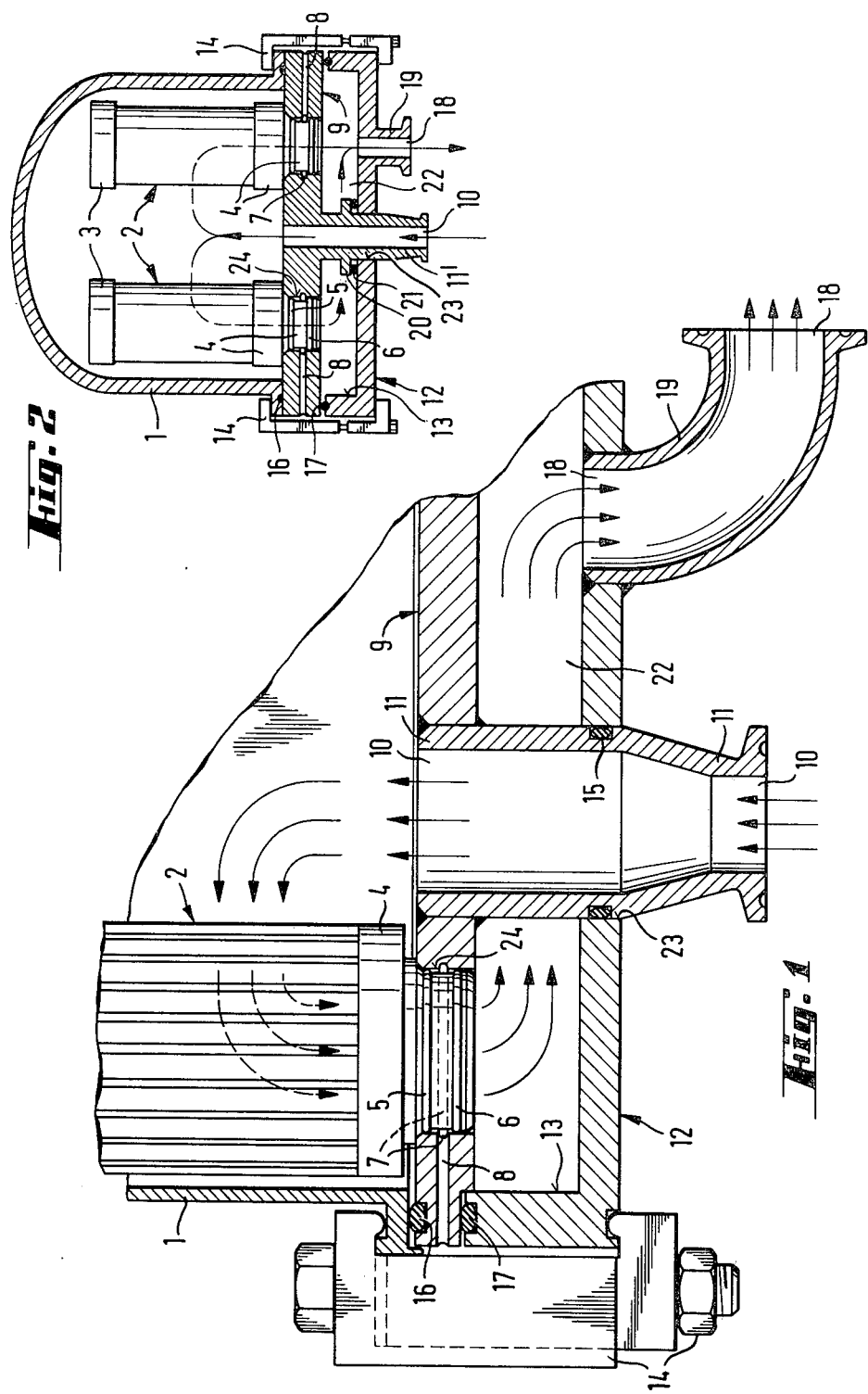

LEAKAGE DETECTING AND DETOURING FILTER HOUSING-ASSEMBLY

FIELD OF THE INVENTION

A filter housing assembly of a plurality of parts for sterile filtering of fluids with means to detect and detour fluids leaking from filter cartridges enclosed therein.

PRIOR ART

Filter cases or housings have end caps of the filter element fixed and sealed in the intermediate plate by two outside O-ring packings. (U.S. Pat. No.: 3,850,813). A requirement for such filters is, that no medium to be filtered must flow from the case top part along the packings into the filtrate space. Nevertheless due to damages to the ring-packings or to the filter elements inserted in a canting manner, such leaky spots appear. The leaky spots, however, cannot be located and cannot be detected even during the filtering operation. This is particularly disadvantageous in sterile filtration since the sterile filtrate once obtained may become non-sterile again because of such leaky spots. (U.S. Pat. No.: 4,126,559).

The danger of leakages rises with the increasing number of the filter elements arranged in a filter case. Usually several filter elements are arranged in the area of the periphery of the intermediate plate. (U.S. Pat. Nos.: 3,298,522; 3,406,831 and GB Pat. No.: 1,163,965).

SUMMARY OF THE INVENTION

The objects of the invention are:

to improve with simple means a filter case of the type described in such a way that leakage losses do not pass from the case top part into the filtrate space and leakages in the interior of the case can be located;

to provide a structure wherein in the area between two ring packings of the filter cap at least one leakage control channel connects this area with the outside of the case;

to provide this area with a ring channel to which the leakage control channel is attached. The ring channel is suitably embedded in the wall of the perforation. When more than two ring packings are provided, the leakage control channel is arranged preferably in the area between the last two ring packings which are located downstream.

When in fact a leaky spot appears in the area of the ring packings, the non-sterile medium cannot enter from the case top part into the sterile space located below this part, but is rather passed through the ring channel and the leakage control channel to the outside of the case where it becomes visible and the leaky spot can be associated with a specific filter element. Since also the ring packing, that is the last in downstream direction and closes directly the sterile space, is designed in such a manner that it resists a liquid pressure, the pressure-free leakage liquid present in the ring channel cannot overcome this ring packing.

BRIEF DESCRIPTION OF THE DRAWINGS

FIG. 1 is a vertical section through a portion of the invention;

FIG. 2 is a vertical section partly in diagram of the apparatus of FIG. 1.

DESCRIPTION OF THE PREFERRED EMBODIMENTS

The multipart housing or casing assembly includes a bell-shaped case top part 1, an intermediate plate 9 and a dish-shaped base plate 12, which elements are connected on their peripheries, with inclusion of packings 16, 17 by clamping means 14 in a tight manner.

The intermediate plate is provided with a tubular connection piece 11 welded or otherwise durably connected to the intermediate plate. The connection piece forms an inlet 10 passing upward through base plate 12 and ending in the top part.

The base plate 12 is dish-shaped. Optionally an associated collar 13 may be molded in downward direction to the intermediate plate, so as to form a filtrate space 22. In sterile filtration this space functions as the sterile space. This sterile space is provided with an outlet connection piece 19.

The outside of the tubular connection piece 11 supports in the area of perforation 23 of the base plate an O-ring packing 15 and serves in addition as a visible leakage control station.

In the embodiment of FIG. 2, a flange 20 is provided on the outer jacket of a tubular connection piece 11', which flange adjusts itself with a packing 21 to the upper edge of the base plate 12 in the area of perforation 23 and is likewise subject to clamping means 14. The filtrate can therefore, if at all, pass at this spot from the filtrate space 22 without the danger of a secondary contamination for the sterile filtrate.

The cartridge-shaped filter element 2 protrudes with its closed end cap 3 into the top part, and with its end cap 4 into a perforation 24 of the intermediate plate 9 and is provided in this area with at least two ring packings 5 and 6, which are fixed with axial spacing on the outside of the end cap and thus seal the bell-shaped space of the top part against the filtrate space 22. The ring packings are pressure resistant.

In order to avoid increases of danger of occurrences of leaky spots on the end caps 4 and to prevent an uncontrolled passing of the medium to be filtered along the two ring packings 5 and 6 into filtrate space 22, particularly in sterile filtration, when several of filter elements are distributed over the periphery of the intermediate plate 9, at least one leakage control channel 8 is attached in the area between the two ring packings 5 and 6, which leakage control channel ends on the housing outside of the intermediate plate and can thus be inspected. Preferably in the free space between the two ring packings is embedded a ring channel 7, either in end cap 4 or in the wall of the perforation 24 of the intermediate plate 9, wherein the leakage control channel 8 ends.

When due to a damaged packing 5 or canting of the filter element a leakage occurs of the medium from the top housing in the direction of the filtrate space 22, the medium, usually a liquid, is discharged from the ring channel 7 through the leakage control channel 8 toward the outside.

Due to the pressure drop in the ring channel 7, the medium can also no longer overcome the resistance of the packing 6 to the sterile space 22. Thus the filtrate does not become non-sterile again. The medium to be filtered is therefore capable only to flow, as it is supposed to, through the filter layers of the filter element 2 into the filtrate space 22.

When more than two ring packings, such as three, are provided on the end cap 4, the leakage control channel is suitably arranged in the downstream direction between the last two ring packings.

The inventive advantage of the leakage control channel 8 becomes particularly obvious when a multiplicity of such filter elements is arranged on the periphery of the intermediate plate 9. Leakages can be determined by means of the leakage control channel associated with each filter element. Each filter element is positioned in a non-tight manner in the intermediate plate 9 and thus suitable measures can be initiated.

What we claim as new and desire to secure by United States Letters Patent is:

1. A leakage detecting and detouring filter housing assembly of a plurality of mating parts for a plurality of cartridge-shaped filter elements comprising:
   a bell-shaped case top part;
   an intermediate plate provided with a plurality of perforations;
   a dish-shaped base plate;
   a plurality of cartridge-shaped filter elements attached to the intermediate plate, said filter elements having an end cap thereof sealed in the perforations of the intermediate plate;
   a leakage control channel for each filter element connecting the area between at least two ring packings with the outside of the housing, the ring packings arranged longitudinally, spaced on the cap against the top part, the intermediate plate being sealed off in the top part by the ring packings;
   a filtrate chamber which closes off the intermediate plate and in which a filter-outlet side ends;
   a filter inlet for the medium to be filtered, which filter inlet protrudes through the base plate and the intermediate plate into the top part of the casing; and
   clamping means for fluidtight connections of the top part, the intermediate plate, and the dish-shaped plate at their peripheries with the packings.

* * * * *